United States Patent
Hills et al.

(10) Patent No.: US 6,501,912 B1
(45) Date of Patent: Dec. 31, 2002

(54) DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE

(75) Inventors: Robert G. Hills, Spencerport, NY (US); James W. Fulmer, Canandaigua, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/494,012

(22) Filed: Jan. 28, 2000

(51) Int. Cl.[7] .............................................. G03B 17/24
(52) U.S. Cl. ...................... 396/319; 396/287; 396/310; 348/333.01
(58) Field of Search ................................. 396/310, 319, 396/410, 380, 435, 436, 287; 348/333.01

(56) References Cited

U.S. PATENT DOCUMENTS

| 4,714,962 | A | | 12/1987 | Levine | 396/429 |
|---|---|---|---|---|---|
| 5,710,954 | A | | 1/1998 | Inoue | 396/374 |
| 5,742,856 | A | * | 4/1998 | Izukawa | 396/319 |
| 5,774,754 | A | * | 6/1998 | Ootsuka | 396/380 |
| 5,905,922 | A | * | 5/1999 | Kido et al. | 396/319 |
| 6,061,530 | A | * | 5/2000 | Haraguchi | 396/319 |

* cited by examiner

Primary Examiner—Russell Adams
Assistant Examiner—Arthur A Smith
(74) Attorney, Agent, or Firm—Roger A. Fields

(57) ABSTRACT

A dual film image capture, electronic image capture camera is capable of electronic information editing after each substantially simultaneous film and electronic exposure, and it magnetically records the information adjacent each one of the exposed film frames after completed exposure of the entire film length.

8 Claims, 5 Drawing Sheets

DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE

CROSS REFERENCE TO RELATED APPLICATIONS

Reference is made to commonly assigned copending applications Ser. No. 09/491,633, entitled DUAL FILM EXPOSURE, ELECTRONIC EXPOSURE CAMERA WITH FILM REWRITE FUNCTION and filed Jan. 26, 2000 in the name of James W. Fulmer, Ser. No. 09/492,055, entitled DUAL FILM EXPOSURE, ELECTRONIC EXPOSURE CAMERA WITH DELAY IN FILM REWIND AFTER FINAL EXPOSURE TO ALLOW FILM REWRITE and filed Jan. 26, 2000 in the name of Robert Hills and James W. Fulmer, and Ser. No. 09/491,448, entitled DUAL FILM EXPOSURE, ELECTRONIC EXPOSURE CAMERA WITH MULTIPLE REWRITE ON FILM EXCEPT FOR FINAL EXPOSURE and filed Jan. 26, 2000 in the names of James W. Fulmer and Robert Hills.

FIELD OF THE INVENTION

The invention relates generally to the field of photography, and in particular to a hybrid film exposure, electronic exposure camera. More specifically, the invention relates to a dual film image capture, electronic image capture camera that is capable of electronic information editing after each substantially simultaneous film and electronic exposure, and that magnetically records the information adjacent each one of the exposed film frames after completed exposure of the entire film length.

BACKGROUND OF THE INVENTION

Prior art U.S. Pat. No. 5,710,954 issued Jan. 20, 1998 discloses a camera for exposing latent images on successive frames of a filmstrip having magnetic recording capacity, in which an electronic image sensor forms an electronic image corresponding to the latent image on a most-recently exposed one of the film frames substantially simultaneously with exposure of the latent image on that exposed frame, a motor is actuated to incrementally advance the filmstrip forward to permit the each unexposed one of the film frames to be exposed and is actuated after the final available one of the film frames is exposed to rewind the exposed film length rearward, and a magnetic head magnetically records user-selected information on the filmstrip adjacent each exposed frame.

The Cross-Referenced Applications

The cross-referenced application Ser. No. 09/491,633, entitled DUAL FILM EXPOSURE, ELECTRONIC EXPOSURE CAMERA WITH FILM REWRITE FUNCTION, discloses a camera for exposing latent images on successive frames of a filmstrip having magnetic recording capacity, including a control that actuates a motor following exposure of each film frame to advance the filmstrip forward one frame increment, and a magnetic head that magnetically records user-selected information on the filmstrip adjacent the most-recently exposed one of the film frames as the filmstrip is advanced forward. The control first actuates the motor to advance the filmstrip rearward one frame increment when it is desired to change the existing information magnetically recorded adjacent the most-recently exposed one of the film frames to some new information, and then actuates the motor to advance the filmstrip forward one frame increment for the magnetic head to magnetically record the new information adjacent the same frame in place of the existing information. Preferably, an electronic image sensor is connected to the control to form an electronic image corresponding to the latent image on the most-recently exposed one of the film frames, and a memory is connected to the control to store the electronic image corresponding to the latent image on the most-recently exposed one of the film frames and to store at least some of the magnetically recorded information for the same frame superimposed on the electronic image.

The cross-referenced application Ser. No. 09/492,055, entitled DUAL FILM EXPOSURE, ELECTRONIC EXPOSURE CAMERA WITH DELAY IN FILM REWIND AFTER FINAL EXPOSURE TO ALLOW FILM REWRITE, discloses a camera for exposing latent images on successive frames of a filmstrip having magnetic recording capacity, includes a memory that stores a count indicative of the film frames remaining to be exposed (including a count of "0" to indicate that the final frame was exposed), a magnetic head that magnetically records user-selected information on the filmstrip adjacent each film frame, and a motor that is actuated following exposure of each film frame to advance the filmstrip forward one frame increment to permit the magnetic head to record the information on the filmstrip adjacent each exposed frame and that is actuated after the magnetic information is written on the filmstrip adjacent the final exposed frame to rewind the exposed film length rearward. An input receiving control is connected to the memory, the magnetic head, and the motor for delaying actuation of the motor to rewind the exposed film length rearward after the magnetic head has magnetically written the information on the filmstrip adjacent the final exposed frame, to give the user some time to manually input to the control that the information magnetically written adjacent the final exposed frame should be rewritten, and in the absence of the input by the time the delay has elapsed triggers actuation of the motor to rewind the exposed film length rearward.

The cross-referenced application Ser. No. 09/491,448, entitled DUAL FILM EXPOSURE, ELECTRONIC EXPOSURE CAMERA WITH MULTIPLE REWRITE ON FILM EXCEPT FOR FINAL EXPOSURE discloses a camera for exposing latent images on successive frames of a filmstrip having magnetic recording capacity, includes a memory that stores a count indicative of the film frames remaining to be exposed (including a count of "0" to indicate that the final frame was exposed), a magnetic head that magnetically records user-selected information on the filmstrip adjacent each film frame, and a motor that is actuated following exposure of each film frame to advance the filmstrip to permit the magnetic head to record the information on the filmstrip adjacent each exposed frame. A plurality of information selection switches can be manually used to select the information the magnetic head will magnetically record on the filmstrip adjacent the most-recently exposed one of the film frames including the final exposed frame. An input receiving control is connected to the memory, the magnetic head, the motor, and the information selection switches to actuate the motor to advance the filmstrip to permit the magnetic head to record the information on the filmstrip adjacent the most-recently exposed one of the film frames except the final exposed frame, each time at least one of the selection switches is used to select the information, and to record the information on the filmstrip adjacent the final exposed frame, only one time at least one of the selection switches is used to select the information.

SUMMARY OF THE INVENTION

A camera for exposing latent images on successive frames of a filmstrip having magnetic recording capacity, in which an electronic image sensor forms an electronic image corresponding to the latent image on a most-recently exposed one of the film frames substantially simultaneously with exposure of the latent image on that exposed frame, a motor is actuated to incrementally advance the filmstrip forward to permit the each unexposed one of the film frames to be exposed and is actuated after the final available one of the film frames is exposed to rewind the exposed film length rearward, and a magnetic head magnetically records user-selected information on the filmstrip adjacent each exposed frame, is characterized in that:

a memory stores the electronic image and the information to be magnetically recorded for every one of the exposed frames;

a display can show the electronic image and at least some of the information stored in the memory for any one of the exposed frames;

an exposed frame selector can be manually used to change the electronic image and the information shown in the display for any one of the exposed frames to the electronic image and the information stored in the memory for another one of the exposed frames; and a plurality of information selectors can be manually used to change the information stored in the memory for the particular one of the exposed frames that corresponds to the electronic image shown in the display, whereby the information to be magnetically recorded adjacent any one of the exposed frames can be changed before the exposed film length is rewound rearward.

Preferably, a control is connected to the motor, the memory and the magnetic head to first actuate the motor after the final available one of the film frames is exposed to rewind the exposed film length rearward, then actuate the motor to continuously advance the exposed film length forward, and finally actuate the motor to rewind the exposed film length rearward. The control causes the magnetic head to magnetically record the information stored in the memory for each exposed frame on the exposed film length when the exposed film length is continuously advanced forward.

DETAILED DESCRIPTION OF THE INVENTION

The invention is disclosed as being embodied preferably in a motorized film advance camera. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
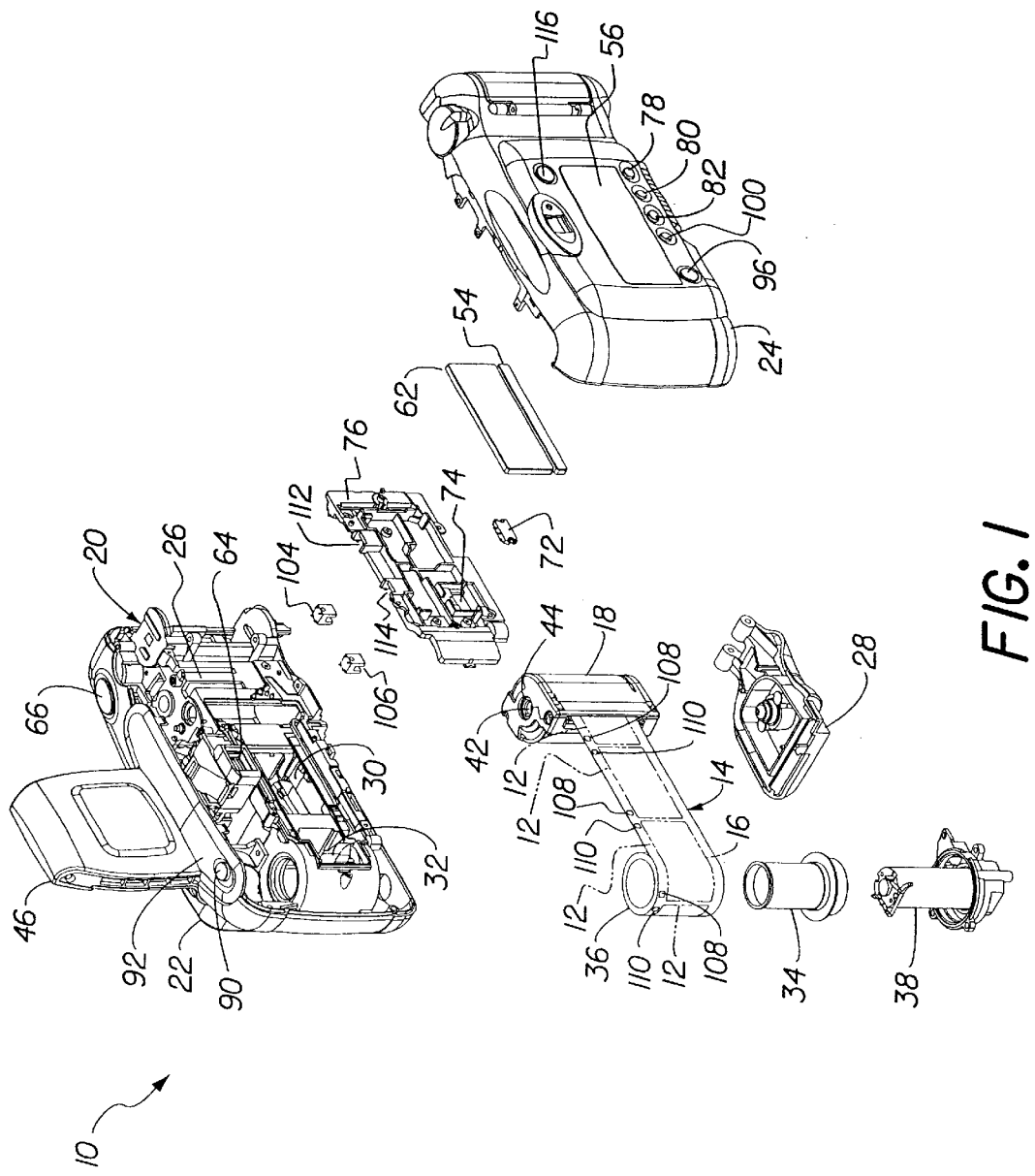
FIG. 1 is a rear exploded perspective view of a dual film exposure, electronic exposure camera according to a preferred embodiment of the invention.
Figure 2:
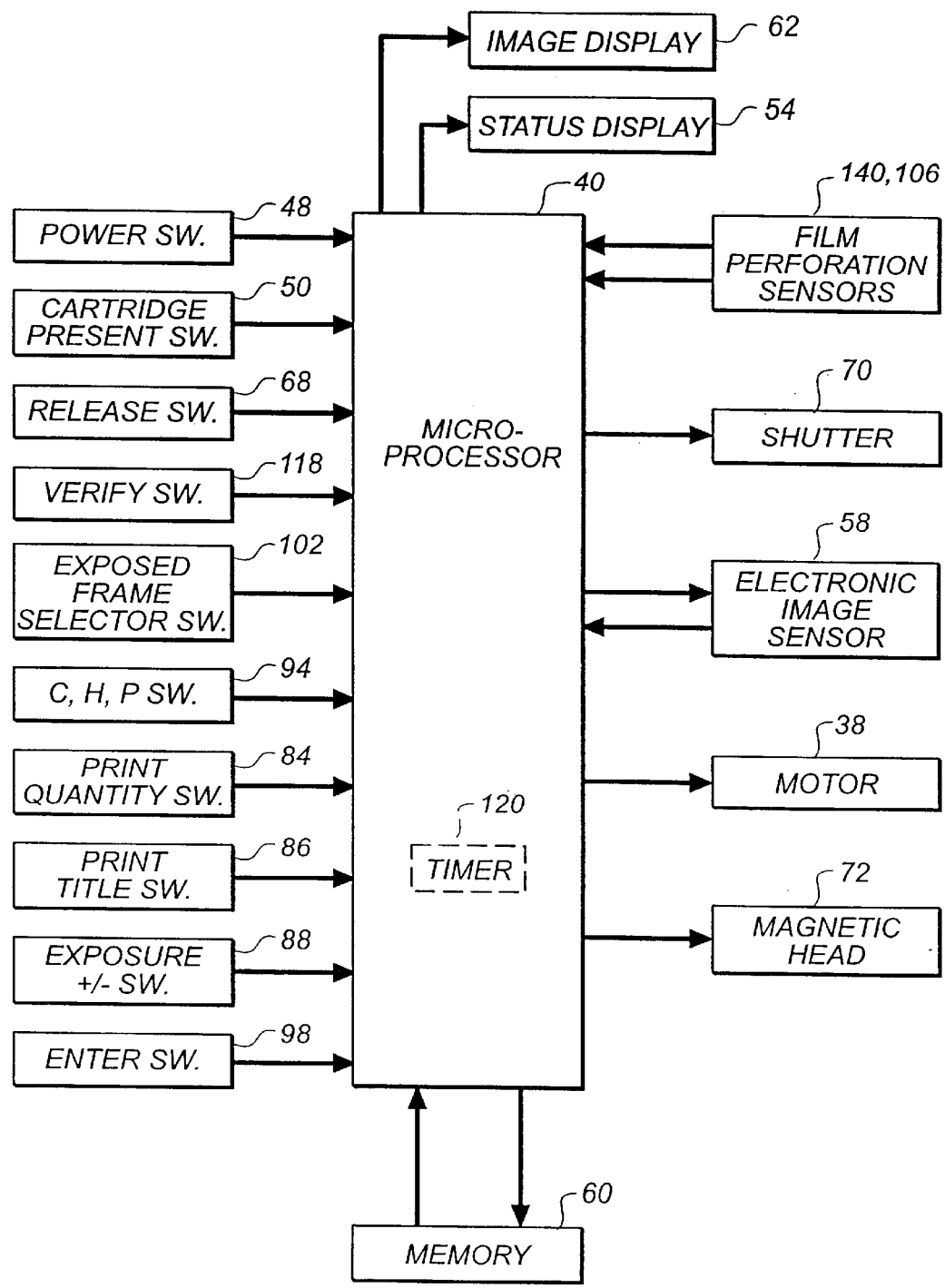
FIG. 2 is a block diagram of various components of the camera.

Referring now to the drawings, FIGS. 1 and 2 show a motorized film advance camera 10 for exposing latent images on successive frames 12 of a known "Advanced Photo System" ("APS") filmstrip 14. The filmstrip 14 has a transparent magnetic overlay which gives it magnetic recording capacity to store various user-selected information along a track 16 adjacent each exposed film frame 12, and it is normally housed in an opaque film cartridge 18. Typically, the filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open backframe opening 30 at which the respective frames 12 of the filmstrip 14 are temporarily positioned one at a time to be exposed, and an exposed film take-up chamber 32 that contains a film take-up spool 34 which is incrementally rotated following each film exposure to wind the most-recently exposed one of the film frames onto an exposed film roll 36 on the spool (and to position a fresh unexposed film frame at the backframe opening 30). When the film take-up spool 34 is incrementally rotated, the filmstrip 14 is advanced forward one frame increment which is slightly greater than a frame width. A drive motor 38 resides inside the film take-up spool 34 for incrementally rotating the spool to advance the filmstrip 14 forward one frame increment, and its operation is controlled by a known microcomputer 40. When substantially the entire length of the filmstrip 14 is exposed, i.e. the total number of available frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the cartridge.

To magnetically record the user-selected information along the track 16 adjacent each exposed film frame 12, the motor 38 must be actuated after the exposed film length is rewound rearward into the film cartridge 18 to continuously rotate the film take-up spool 34 in order to advance the exposed film length forward. Then, the motor 38 is actuated to continuously rotate the film spool inside the film cartridge 18 in order to rewind the film length with the recorded information rearward into the cartridge, and the door 28 is pivoted open to remove the cartridge from the cartridge receiving chamber 26.

A known electronic flash unit 46 for flash assisted exposures is flipped up from partially covering the front cover part 22 to uncover a taking lens (not shown) preparatory to using the camera 10. See FIG. 1. Flipping up the flash unit 46 closes a normally open power switch 48 connected to the microcomputer 40 to electrically power "on" the camera 10. See FIG. 2.

Figure 3:
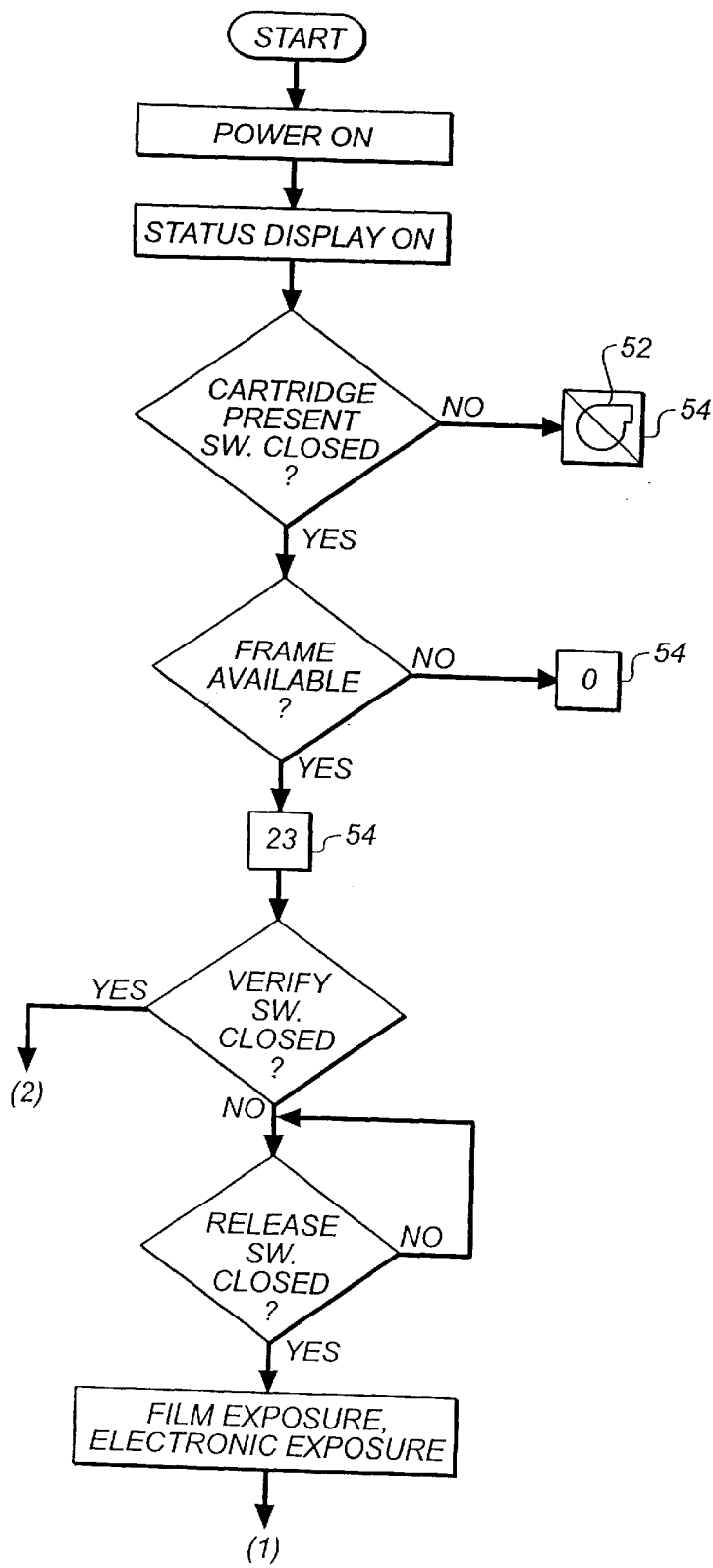
FIGS. 3, 4 and 5 is a flow chart depicting operation of the camera to illustrate the invention.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and is located behind a window 56 in the rear cover part 24. See FIG. 1. If the camera 10 is powered "on" and the cartridge present switch 50 is closed, a visible cartridge loaded indication (not shown) is shown in the status display 54 A known electronic image sensor 58, for example a CCD sensor with integrated shuttering capability or a CMOS sensor with integrated shuttering capability, is connected to the microcomputer 40 to form a different electronic image each time one of the unexposed film frames 12 is exposed. The respective electronic images correspond to the latent images on the exposed film frames 12, are each stored in a memory 60 connected to the microcomputer 40, and can be shown one at a time in a known image display 62 such as a color LCD connected to the microcomputer. The image display 62 is located next to the status display 54, behind the window 56 in the rear cover part 24. The memory 60 has storage capacity for storing at least 40 electronic images, since the filmstrip 14 is available in 15-exposure, 25-exposure, and 40-exposure lengths.

A viewfinder 64 for viewing a subject to be photographed is located on the main body part 20. See FIG. 1.

To take a picture, a shutter release button 66 on the front cover part 22 is manually depressed which in turn closes a normally open release switch 68 connected to the microcomputer 40. See FIGS. 1 and 2. The closed switch 68 triggers momentary opening of a known normally closed shutter 70 to expose a latent image on the film frame 12 at the backframe opening 30, and to excite the electronic image sensor 58 to form an electronic image substantially simultaneously with exposure of the latent image. The taking lens (not shown) can be used to focus an image of the subject being photographed, for the electronic image sensor 58 as well as for the filmstrip 14, or a separate lens an be provided for the electronic image sensor. These alternatives are indicated in prior art U.S. Pat. No. 5,710,954 issued Jan. 20, 1998.

A magnetic head 72 is mounted within an opening 74 in a film pressure platen 76 for magnetically recording the user-selected information along the track 16 adjacent each one of the exposed film frames 12. The film pressure platen 76 serves to support each film frame 12 flat for exposure at the backframe opening 30.

The user-selected information, as is known, can be a selected print quantity, a selected (optional) print title, a selected (optional) print exposure correction +/−, and a selected "APS" print format "C" (classic), "H" (HDTV) or "P" (panoramic), for example. A "C" format print is usually 4×6 inches, a wider "H" format print is often 4×7 inches, and a much wider "P" format print is either 4×10 inches or 4×11.5 inches. The selected print quantity, print title, and print exposure correction, and the selected "APS" print formats "C", "H" or "P", for every one of the exposed film frames 12 are stored in the memory 60. Individual visible indications of the selected print quantity, print title, and print exposure correction for any one of the exposed film frames 12 can be seen in the status display 54. A visible indication of the selected "APS" print format "C", "H" or "P" for any one of the exposed film frames 12 can be seen in the image display 62 (preferably superimposed on the electronic image shown in the image display). Respective print quantity, title and exposure correction buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 in order to change the print quantity, title and exposure correction stored in the memory 60 for any one of the exposed film frames 12 to new selections for the same exposed film frame. A format selection button 90 is provided on a top plate 92, and when manually depressed one or more times closes a normally open C, H, P switch 94 the same number of times. The C, H, P switch 94 is connected to the microcomputer 40 in order to change the C, H or P selection stored in the memory 60 for any one of the exposed film frames 12 to a new selection for the same exposed film frame. To enter the newly selected information in the memory 60, an enter button 96 on the rear cover part 24 must be manually depressed which in turn closes a normally open enter switch 98 connected to the microcomputer 40.

An exposed frame selector button 100 is provided on the rear cover part 24, and when manually depressed one or more times closes a normally open exposed frame selector switch 102 the same number of times to change the electronic image and the "APS" print format "C", "H" or "P" shown in the image display 62 for any one of the exposed film frames 12, and to change the print quantity, print title, and print exposure correction shown in the status display 54 for the same exposed film frame, to the electronic image and the user-selected information for another one of the exposed film frames. This is possible because the electronic images that match the exposed film frames, and the user-selected information for the exposed film frames, are stored in the memory 60. Thus, one can effectively scroll through the electronic images and the user-selected information stored in the memory 60 for the exposed film frames 12, and successively see the electronic images and the user-selected information for any one of the exposed film frames in the status and image displays 54 and 62. This is done in preparation for manually depressing the print quantity, title and exposure correction buttons 78, 80 and 82 and the format selection button 90 to change the user-selected information stored in the memory for any one of the exposed film frames 12.

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count stored in the memory 60 by "1", each time the filmstrip 14 is advanced forward a frame increment and the most-recently exposed one of the film frames 12 is wound onto the exposed film roll 36 on the film take-up spool 34. The frame count begins with "15", "25" or "40" depending whether the filmstrip 40 has a 15-exposure, 25-exposure, or 40-exposure length.

A verify (print preview) button 116 is provided on the rear cover part 24, and when manually depressed closes a normally open verify switch 118 connected to the microcomputer 40. See FIGS. 1 and 2. The closed verify switch 118 causes the electronic image and the "APS" print format "C", "H" or "P" stored in the memory 60 for the most-recently exposed one of the film frames 12 to be shown in the image display 62, and it causes the print quantity, print title, and print exposure correction stored in the memory for the same exposed film frame to be shown in the status display 54. If, however the exposed frame selector switch 102 had been closed to change the electronic image and the "APS" print format "C", "H" or "P" shown in the image display 62 and to change the print quantity, print title, and print exposure correction shown in the status display 54, from that for the most-recently exposed one of the film frames to that for an earlier exposed one of the film frames, then the closed verify switch 118 causes the electronic image and the user-selected information for the earlier exposed film frame to be shown in the displays.

Operation

Figure 4:
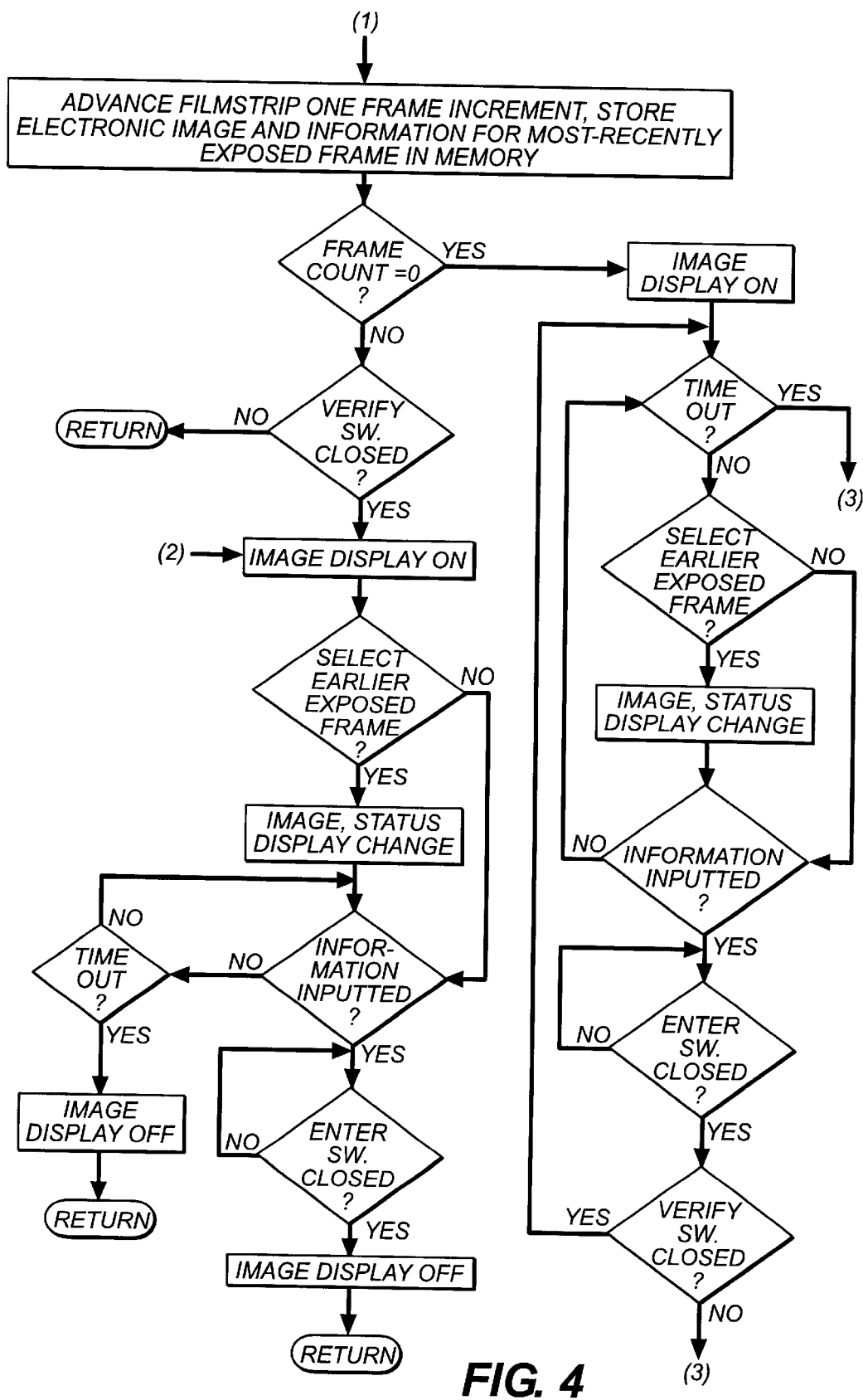
Figure 5:
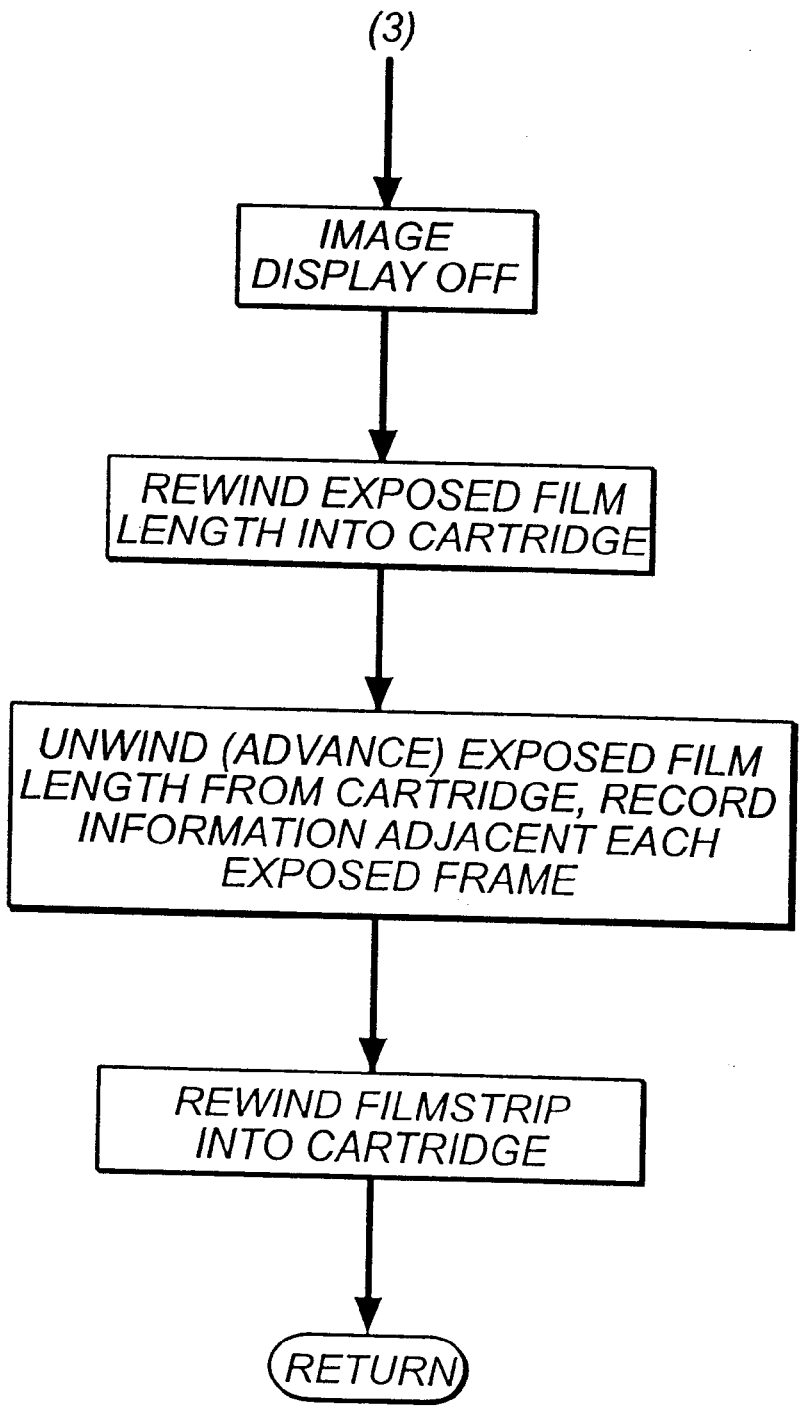

The operation of the camera 10 to illustrate the invention is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count stored in the memory 60.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively an earlier exposed one) of the film frames 12. Also, the status display 54 now shows the user-selected information stored in the memory 60 for the same exposed film frame, except that the visible indication of the selected "APS" print format "C", "H" or "P" is shown in the image display 62 superimposed on the electronic image.

7. If conversely in FIG. 3, the verify switch 118 remains open, and the release switch 68 is not closed within an allotted time, e.g. 150 seconds, determined by a timer 120 in the microcomputer 40, the camera 10 is powered "off" for battery consumption.

8. If conversely in FIG. 3, the verify switch 118 remains open, and the release switch 68 is closed within the allotted time, e.g. 150 seconds, determined by the timer 120 in the microcomputer 40, because a picture is being taken, a latent image is exposed on the film frame 12 at the backframe opening 30 and the electronic image sensor 58 is excited to form an electronic image which matches the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image and the user-selected information for the most-recently exposed frame 12 are stored in the memory 60, and the frame count stored in the memory is decremented by "1", for example to "22."

10. If next in FIG. 4 the frame count in the memory 60 is greater than "0", the verify switch 114 can be closed.

11. If then in FIG. 4 the verify switch 118 is not closed within the allotted time, e.g. 150 seconds, determined by the timer 120 in the microcomputer 40, or alternatively the release switch 68 is not closed within the same time, the camera 10 is powered "off" for battery consumption.

12. If conversely in FIG. 4 the verify switch 118 is closed within the allotted time (as in FIG. 3), e.g. 150 seconds, determined by the timer 120 in the microcomputer 40, the image display 62 is turned "on" to show the electronic image stored in the memory 60 corresponding to the latent image on the most recently exposed one (or alternatively an earlier exposed one) of the film frames 12. Also, the status display 54 now shows the user-selected information for the same exposed film frame, except that the visible indication of the selected "APS" print format "C", "H" or "P" is shown in the image display 62 superimposed on the electronic image.

13. If next in FIG. 4 the exposed frame selector switch 102 is not closed within the allotted time, e.g. 150 seconds, determined by a timer 120 in the microcomputer 40, and none of the user-selected information switches 84, 86, 88 and 94 are closed within a brief time, e.g. 10 seconds, determined by the timer, the image display 62 is turned "off". The camera 10 including the status display 54 remains "on."

14. If conversely in FIG. 4 the exposed frame selector switch 102 is not closed within the allotted time, e.g. 150 seconds, determined by the timer 120 in the microcomputer 40, and at least one of the user-selected information switches 84, 86, 88 and 94 is closed within the brief time, e.g. 10 seconds, determined by the timer, then when the enter switch 98 is closed, the image display 62 is turned "off", and the electronic image and the new selected information for the most-recently exposed one of the film frames 12 are stored in the memory 60 in place of the previously stored information for the same exposed film frame.

15. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94 is closed within the brief time, e.g. 10 seconds, and the enter switch 98 is closed, the image display 62 is turned "off", and the electronic image and the new selected information for the earlier exposed film frame 12 are stored in the memory 60 in place of the previously stored information for the same exposed film frame.

16. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "APS" print format "C", "U" or "P" is shown in the image display 62 superimposed on the electronic image. The image display 62 is turned "on" in this instance (as compared with the other instance in FIG. 4 that it is turned "on") without having to first close the verify switch 118.

17. If next in FIG. 4, the exposed frame selector switch 102 is not closed within the allotted time, e.g. 150 seconds, and none of the user-selected information switches 84, 86, 88 and 94 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18 from the cartridge receiving chamber 26.

18. If conversely in FIG. 4 the exposed frame selector switch 102 is not closed within the allotted time, e.g. 150 seconds, and at least one of the user-selected information switches 84, 86, 88 and 94 is closed within the brief time, e.g. 10 seconds, the image display 62 remains "on." Then when the enter switch 98 is closed and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

19. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) is shown in the status and image displays 54 and 62. Then, when at least one of the user-selected information switches 84, 86, 88 and 94 is closed within the brief time, e.g. 10 seconds, and the enter switch 98 is closed, and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

20. If conversely in FIG. 4 the verify switch 118 is closed within the allotted time, e.g. 150 seconds, go back to step 17 above.

The invention has been described with reference to a preferred embodiment. However, it will be appreciated that variations and modifications can be effected by a person of ordinary skill in the art without departing from the scope of the invention. For example, when in FIG. 4 the enter switch 98 is not closed within an allotted time, e.g. 150 seconds, determined by the timer 120 in the microcomputer 40, and alternatively the release switch 68 is not closed within the same time, the camera 10 could be powered "off" for battery consumption.

PARTS LIST 10. camera
12. film frames
14. filmstrip
16. track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spool end
46. electronic flash unit
48. power switch
50. cartridge present switch
52. no-cartridge warning
54. status display
56. window
58. electronic image sensor
60. memory
62. image display
64. viewfinder
66. shutter release button
68. release switch
70. shutter
72. magnetic head
74. opening
76. film pressure platen
78. print quantity button
80. print title button
82. exposure correction button
84. print quantity switch
86. print title switch
88. exposure correction switch
90. format selection button
92. top plate
94. C, H ,P switch
96. enter button
98. enter switch
100. exposed frame selector button
102. exposed frame selector switch
104. film perforation sensor
106. film perforation sensor
108. film perforation
110. film perforation
112. pocket
114. pocket
116. verify button
118. verify switch
120 timer

What is claimed is:

1. A camera for exposing latent images on successive frames of a filmstrip having magnetic recording capacity, in which an electronic image sensor forms an electronic image corresponding to the latent image on a most-recently exposed one of the film frames substantially simultaneously with exposure of the latent image on that exposed frame, a motor is actuated to incrementally advance the filmstrip forward to permit each unexposed one of the film frames to be exposed and is actuated after the final available one of the film frames is exposed to rewind the exposed film length rearward, and a magnetic head magnetically records user-selected information on the filmstrip adjacent each exposed frame, is characterized in that:

a memory stores the electronic image and the information to be magnetically recorded for every one of the exposed frames;

a display can show the electronic image and at least some of the information stored in said memory for any one of the exposed frames, but shows the electronic image automatically only for the final exposed one of the film frames;

an exposed frame selector can be manually used to change the electronic image and the information shown in said display for any one of the exposed frames to the electronic image and the information stored in said memory for another one of the exposed frames; and a plurality of information selectors can be manually used to change the information stored in said memory for the particular one of the exposed frames that corresponds to the electronic image shown in said display, whereby the information to be magnetically recorded adjacent any one of the exposed frames can be changed before the exposed film length is rewound rearward.

2. A camera as recited in claim 1, wherein a verify switch is connected to said display and said information selection switches to be manually used to cause said display to show the electronic image and at least some of the information stored in said memory for the most-recently exposed one of the film frames before said information selection switches can be manually used to change the information stored in said memory for any one of the exposed frames.

3. A camera as recited in claim 1, wherein a control is connected to said motor, said memory and said magnetic head to first actuate said motor after the final available one of the film frames is exposed to rewind the exposed film length rearward, then actuate said motor to continuously advance the exposed film length forward, and finally actuate said motor to rewind the exposed film length rearward, and said control causes said magnetic head to magnetically record the information stored in said memory for each exposed frame on the exposed film length when the exposed film length is continuously advanced forward.

4. A camera as recited in claim 3, wherein said control is connected to said display to end showing the electronic image in said display for any one of the exposed frames when said control actuates said motor after the final available one of the film frames is exposed to rewind the exposed film length rearward.

5. A camera as recited in claim 3, wherein said memory stores a frame count that is decremented each time one of the film frames is exposed to permit said control to actuate said motor after the final available one of the film frames is exposed to rewind the exposed film length rearward.

6. An information selection method in a camera for exposing latent images on successive frames of a filmstrip having magnetic recording capacity, in which an electronic image sensor forms an electronic image corresponding to the latent image on a most-recently exposed one of the film frames substantially simultaneously with exposure of the latent image on that exposed frame, a motor is actuated to incrementally advance the filmstrip forward to permit the each unexposed one of the film frames to be exposed and is actuated after the final available one of the film frames is exposed to rewind the exposed film length rearward, and a magnetic head magnetically records user-selected information on the filmstrip adjacent each exposed frame, is characterized by the steps of:

storing in a memory the electronic image and the information to be magnetically recorded for every one of the exposed frames;

showing in a display the electronic image and at least some of the information stored in the memory for the most-recently exposed one of the exposed frames, but showing the electronic image automatically only for the final exposed one of the film frames;

changing the electronic image and the information shown in the display for the most-recently exposed one of the film frames to the electronic image and the information stored in the memory for another one of the exposed frames; and changing the information stored in the memory for the particular one of the exposed frames that corresponds to the electronic image shown in the display, whereby the information to be magnetically recorded adjacent any one of the exposed frames can be changed before the exposed film length is rewound rearward.

7. An information selection method as recited in claim 6, further having the steps of first actuating the motor after the final available one of the film frames is exposed to rewind the exposed film length rearward, then actuating the motor to continuously advance the exposed film length forward, and finally actuating the motor to rewind the exposed film length rearward, and magnetically recording the information stored in the memory for each exposed frame on the exposed film length when the exposed film length is continuously advanced forward.

8. A camera for exposing latent images on successive frames of a filmstrip having magnetic recording capacity, in which an electronic image sensor forms an electronic image corresponding to the latent image on a most-recently exposed one of the film frames substantially simultaneously with exposure of the latent image on that exposed frame, a motor is actuated to incrementally advance the filmstrip forward to permit each unexposed one of the film frames to be exposed and is actuated after the final available one of the film frames is exposed to rewind the exposed film length rearward, and a magnetic head magnetically records user-selected information on the filmstrip adjacent each exposed frame, is characterized in that:

a memory stores the electronic image and the information to be magnetically recorded for every one of the exposed frames;

a display can show the electronic image and at least some of the information stored in said memory for any one of the exposed frames, but shows the electronic image automatically only for the final exposed one of the film frames; and a verify switch is connected to said display to be manually used to cause said display to show the electronic image and at least some of the information stored in said memory for any one of the exposed frames, except the final exposed frame whose electronic image is shown automatically.

* * * * *